(No Model.)
E. A. SPERRY.
REGULATOR FOR DYNAMO ELECTRIC MACHINES.
No. 353,988. Patented Dec. 7, 1886.
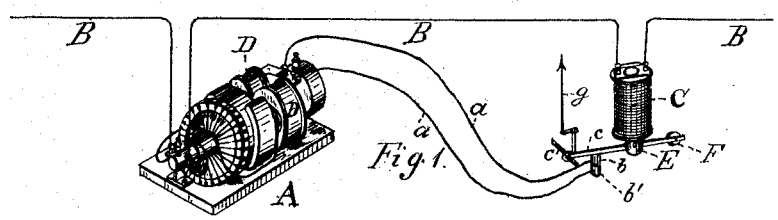
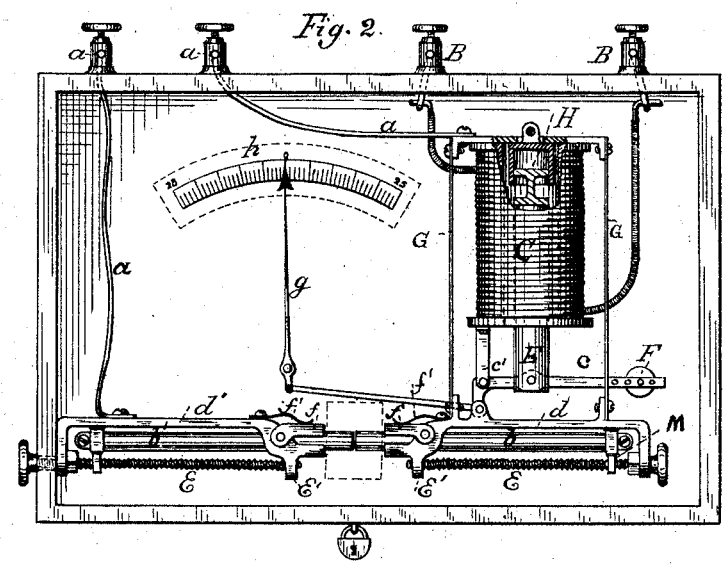
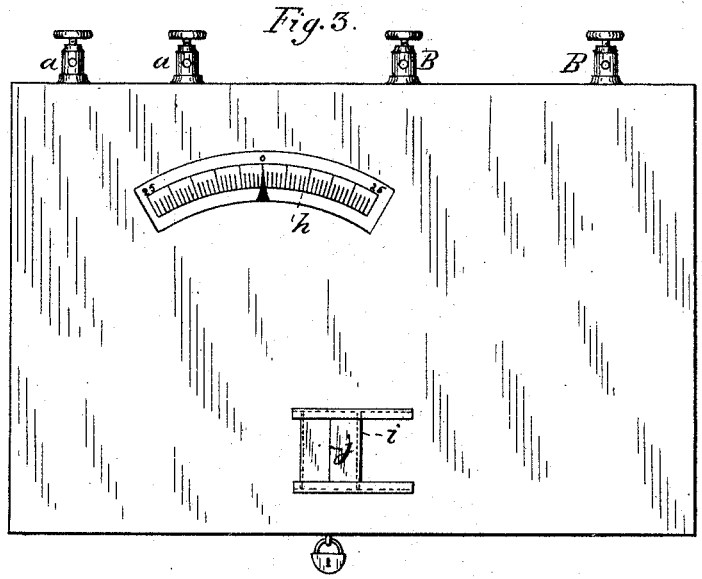
Witnesses:
G. Huzel.
Edgar T. Gaddes.
Inventor:
Elmer A. Sperry
By R. Nottingham
Attorney.

UNITED STATES PATENT OFFICE.

ELMER A. SPERRY, OF CHICAGO, ILLINOIS.

REGULATOR FOR DYNAMO-ELECTRIC MACHINES.

SPECIFICATION forming part of Letters Patent No. 353,988, dated December 7, 1886.

Application filed October 28, 1884. Serial No. 146,698. (No model.)

*To all whom it may concern:*

Be it known that I, ELMER A. SPERRY, a citizen of the United States, residing at Chicago, in the county of Cook and State of Illinois, have invented certain new and useful Improvements in Regulators for Dynamo - Electric Generators and Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to a novel method of regulating the intensity of the field of a dynamo-electric machine or motor; and it consists, first, in an arrangement of parts whereby the strength of the current circulating in the field-magnets is varied by a counter electro-motive force.

It consists, secondly, of an arrangement of electrical devices by means of which such counter electro-motive force is varied in response to the variations in the main electric current.

It consists, thirdly, in an electrical device whereby the regulation of the field is made to depend upon the condition of the exterior useful circuit of the machine which is so controlled; and it consists, fourthly, in certain novel details whereby these results are accomplished.

Figure 1 represents a diagrammatic view showing in outline the electric generator or motor and the relative circuit-connections of the device in point. Fig. 2 shows in detail the various parts of the apparatus. Fig. 3 shows the case in which such apparatus is contained, with the lid or cover in place.

Similar letters refer to like parts throughout the drawings, in which—

A indicates a dynamo-electric generator or motor, the field-magnets of which are in a derived circuit, which also includes the wires $a\,a$ and two contacts, $b\,b'$. In Fig. 1 one of these contacts is shown as superimposed upon the other, and their upper contact is connected to a lever, $c$, pivoted at $c'$, and connected with the suction-core E of a solenoid, C, whose windings are included in the main circuit B B B of the dynamo. The lever $c$ is provided at its free end with an adjustable weight, F.

In the construction exhibited in Fig. 2, which is my preferred form, the same general disposition of parts is shown, the difference consisting in details whereby the regulator is accommodated to its casing and its efficiency and desirability increased. In such figure the main circuit B B and the derived circuit $a\,a$ are led in by suitable binding-posts, the main circuit being connected with the solenoid winding, and the contacts being included, as before, in the derived circuit. The solenoid is provided at one end with a dash-pot or air-buffer, H, within which plays the inner end of the core E, thereby diminishing the effects of the momentum with which the said core is actuated by sudden changes in the resistance of the main circuit. The weight-carrying lever $c$, to which the outer end of the core is attached, is pivoted at $c'$ to a projection from the solenoid-spool, and connects by a short arm with a swinging frame, $d$. Springs G G, attached to lugs upon the frame $d$, insure an easy vibration of the latter. A screw, E, bearing a traveling nut, M, and a thumb-piece, is mounted in downwardly-extending projections of the frame $d$. The traveling nut carries a clamping-socket for the reception of one end of the contact or electrode $b$. The other end of the said electrode is held in position by a friction-clamp consisting of the pivoted piece $f$ and bearing-spring $f'$. The electrode is forced backward or forward through this clamp, according as the nut is caused to travel in one direction or the other, by turning the thumb-piece of the screw-rod. The opposite electrode, $b'$, is located within a fixed frame, $d'$, and is adjustable backward and forward in like manner. To the movable frame $d$ is connected by a link short arm of pivoted index-finger or pointer $g$, indicating upon the surface of a graduated arc-scale, $h$, the position of the frame $d$. In front of the abutting ends of the electrodes $b\,b'$ the box is cut away for the reception of a plate of thin glass, $i$, having midway of its breadth a vertical line or scratch, $j$. This glass may, if desired, be protected from injury, where not in use, by means of a sliding screen. (Not shown.)

The parts being constructed and arranged as shown, the operation of the invention is as follows: For convenience of explanation, the dynamo A, Fig. 1, may be considered as a generator supplying current to electric-arc lamps in series situated in the main circuit B. The current supplying the field of force and traversing the helices D also traverses the circuit-wires *a* and contacts *b b'*, which, for convenience, consist of carbon such as is ordinarily used in electric lighting. The weight F upon the lever C is so adjusted against the pull of the suction-core E as to keep said contacts together when the normal current is traversing the circuit. Should such current increase from any cause—as, for instance, the removal of an arc lamp from the circuit—the attraction of the solenoid C upon the core E will overcome the gravity of the system and separate the contacts *b b'*, forming a voltaic arc between such points, the length of which would be dependent upon the amount of increase of the main current of the machine. This not only offers a resistance to the passage of the current through the field-circuit, but also, by the slight counter electro-motive force offered by the voltaic arc thus produced, the current strength and magnetism of the field are decreased, thus decreasing the current strength upon the main circuit B, bringing it to a normal again.

The operation of the device in point is peculiar, and if analyzed carefully will be found as follows, viz: When a variation of current in the main circuit occurs, owing to an increase of resistance upon said main circuit, this device acts to effect the desired regulation, but in a small degree. The difference of potential at the terminals of the generator A will increase, according to the well-known "building up" principle of shunt-wound dynamos; but when a variation occurs in the main circuit B by a decrease of resistance the operation of the device is most effective, and is as has been first above described. It might be expected, upon a constant maintenance of this decreased resistance, that a small arc would continually exist between the contacts *b b'*, which, in fact, is not the case, there being but a momentary arc produced, which, in bringing down the intensity of the field, as above stated, decreases the total electro-motive force at the terminals of the machine, and thereby renders it impossible for the field to regain its former degree of magnetization, reacting in like manner upon the armature and difference of potential at the terminals of the machine, and keeping the exterior current thus reduced.

Carbon is found the most preferable substance for the contacts *b* and *b'*, inasmuch as change of pressure in the contacts changes the resistance delicately before an actual break in the circuit occurs, which is found to assist in neutralizing small fluctuations in the main-circuit strength.

It will be readily understood that the separation of the contacts *b b'* may be effected by an attendant clock-work or other means. The peculiar arrangement of the electrodes *b b'* and friction-clamps *f f* is for the purpose of feeding each electrode or contact as it is consumed or wasted away by the production of the voltaic arc, and the scratch *j* upon the glass enables the attendant to note their respective adjustment, so as to keep the arc midway between the clamps.

The object of the index *g* and scale *h* is to indicate at all times the position of the core E in relation to the solenoid-helix C, as a constant relation is necessary for the uniform operation of the system, and, furthermore, as this relation can be easily destroyed by a wrong adjustment of either of the electrodes *b b'*, as will be readily understood. The vibration of the electrode *b* is in a horizontal line, and the vibrating portions are supported by perpendicular parallel springs, for the reason that the weight of the system constantly decreases as the electrodes consume, and thereby tends to throw the regulator out of delicate adjustment. It will be seen, therefore, that this forms an important feature of the invention.

What I claim, and desire to secure by Letters Patent, is—

1. The combination, with the field-helices of a dynamo-electric machine or motor, of carbon electrodes or contacts included in the circuit thereof, and an electrical device included in a separate electric circuit and controlling the separation of the carbon electrodes or contacts in response to the variations of the electric current in said separate circuit, substantially as described.

2. The combination, with the field-helices of a dynamo machine or motor, of carbon electrodes or contacts in circuit with said helices, and mechanism, substantially as described, whereby separation of said contacts is controlled in response to variations in the main electric current supplied by or to the machine, substantially as and for the purpose specified.

3. The combination, with the main circuit of a dynamo-electric machine, of an electrical device included in such circuit, and a field-magnet helix in a derivation of said circuit, carbon contacts included in said derived circuit, and mechanism, substantially as described, connected with said electrical device, for controlling the separation of said contacts, substantially as and for the purpose specified.

4. In a regulator of the kind described for dynamo-electric machines, the movable carbon-holder having a horizontal vibration and supported by parallel springs, substantially as described.

5. In a regulator of the kind described for dynamo-electric machines, the combination of the solenoid included in the main circuit, the electrodes included in the derived circuit, the suction-core, the adjustably-weighted lever, and the vibratory carbon-holder, substantially as shown and described.

6. In a regulator of the kind described for dynamo-electric machines, the combination, with the solenoid in the main circuit, of the electrodes in the derived circuit, the suction-core, the vibratory carbon-holder connected therewith, and the index-finger, substantially as shown and described.

7. In a regulator of the kind described for electric machines, the combination, with the frame $d$, having dependent projections, of the screw E, traveling nut M, and spring friction-clamp $f$, substantially as described.

8. In a regulator of the kind described for dynamo-electric machines, the combination, with the abutting carbon electrodes, of the carbon-holders, the regulating-screws, and the marked glass, substantially as described.

In testimony whereof I affix my signature in presence of two witnesses.

ELMER A. SPERRY.

Witnesses:
CONSIDER H. WILLETT,
F. A. WOODBURY.